United States Patent [19]

Nooren

[11] Patent Number: 5,116,413
[45] Date of Patent: May 26, 1992

[54] PROCESS AND SEALING AGENT FOR PRODUCING A WATERTIGHT AND/OR GASTIGHT BUSHING OF LINES IN A WATER-RESISTANT AND/OR GAS-BLOCKING WALL, AND DEVICE FOR USE THEREOF

[75] Inventor: Franciscus P. M. Nooren, Stadskanaal, Netherlands

[73] Assignee: Waterproof Coatings S.A., Luxembourg, Luxembourg

[21] Appl. No.: 713,576

[22] Filed: Jun. 11, 1991

Related U.S. Application Data

[63] Continuation of Ser. No. 360,354, Jun. 2, 1989, abandoned.

[30] Foreign Application Priority Data

Jun. 3, 1988 [NL] Netherlands .................. 8801436

[51] Int. Cl.$^5$ .................. C08L 1/00; C08L 3/00; C08L 5/00
[52] U.S. Cl. .................. 106/212; 106/33; 106/162; 106/163.1; 106/202; 106/216; 106/273.1; 106/278; 106/281.1; 106/283; 106/285; 106/DIG. 4; 405/263; 405/264; 405/265; 523/130; 524/59; 524/60; 524/66
[58] Field of Search .......... 106/162, 163.1, 202, 106/212, 216, 273.1, 278, 281.1, 283, 285, DIG. 4, 33; 405/263-265; 523/130; 524/59, 60, 66

[56] References Cited

U.S. PATENT DOCUMENTS

| | | | |
|---|---|---|---|
| Re. 29,753 | 9/1978 | Williams | 106/805 |
| 1,417,835 | 5/1922 | Kirschbraun | 106/DIG. 4 |
| 1,744,869 | 1/1930 | Cross | 106/DIG. 4 |
| 4,279,547 | 7/1981 | Clem | 106/DIG. 4 |
| 4,558,875 | 12/1985 | Yamaji et al. | 106/DIG. 4 |
| 4,886,550 | 12/1989 | Alexander | 106/811 |
| 4,964,918 | 10/1990 | Brown et al. | 106/811 |
| 4,997,487 | 3/1991 | Vinson et al. | 106/805 |

FOREIGN PATENT DOCUMENTS

| | | |
|---|---|---|
| 0161557 | 4/1985 | European Pat. Off. . |
| 0234950 | 2/1987 | European Pat. Off. . |
| 0244514 | 11/1987 | European Pat. Off. . |
| 2912400 | 10/1980 | Fed. Rep. of Germany . |
| 2569911 | 3/1986 | France . |
| 7203941 | 9/1973 | Netherlands . |
| 8001473 | 10/1981 | Netherlands . |

OTHER PUBLICATIONS

The Netherlands Search Report for Netherlands Application No. 8801436, including a translation thereof.

Primary Examiner—William R. Dixon, Jr.
Assistant Examiner—Anthony J. Green
Attorney, Agent, or Firm—Webb, Burden, Ziesenheim & Webb

[57] ABSTRACT

A process is provided for feeding cables, wires, pipes etc. through a wall in such a way that the water- and/or gas resistance of the wall is maintained and that later on additional cables etc. can be passed through. The process uses a sealing agent comprising an intimate mixture of a water-swellable substance such as a clay and a hydrophobic substance such as vaseline. The sealing agent can be placed in a tubular device for providing water-tightness when making a bushing in a partially porous wall.

8 Claims, 2 Drawing Sheets

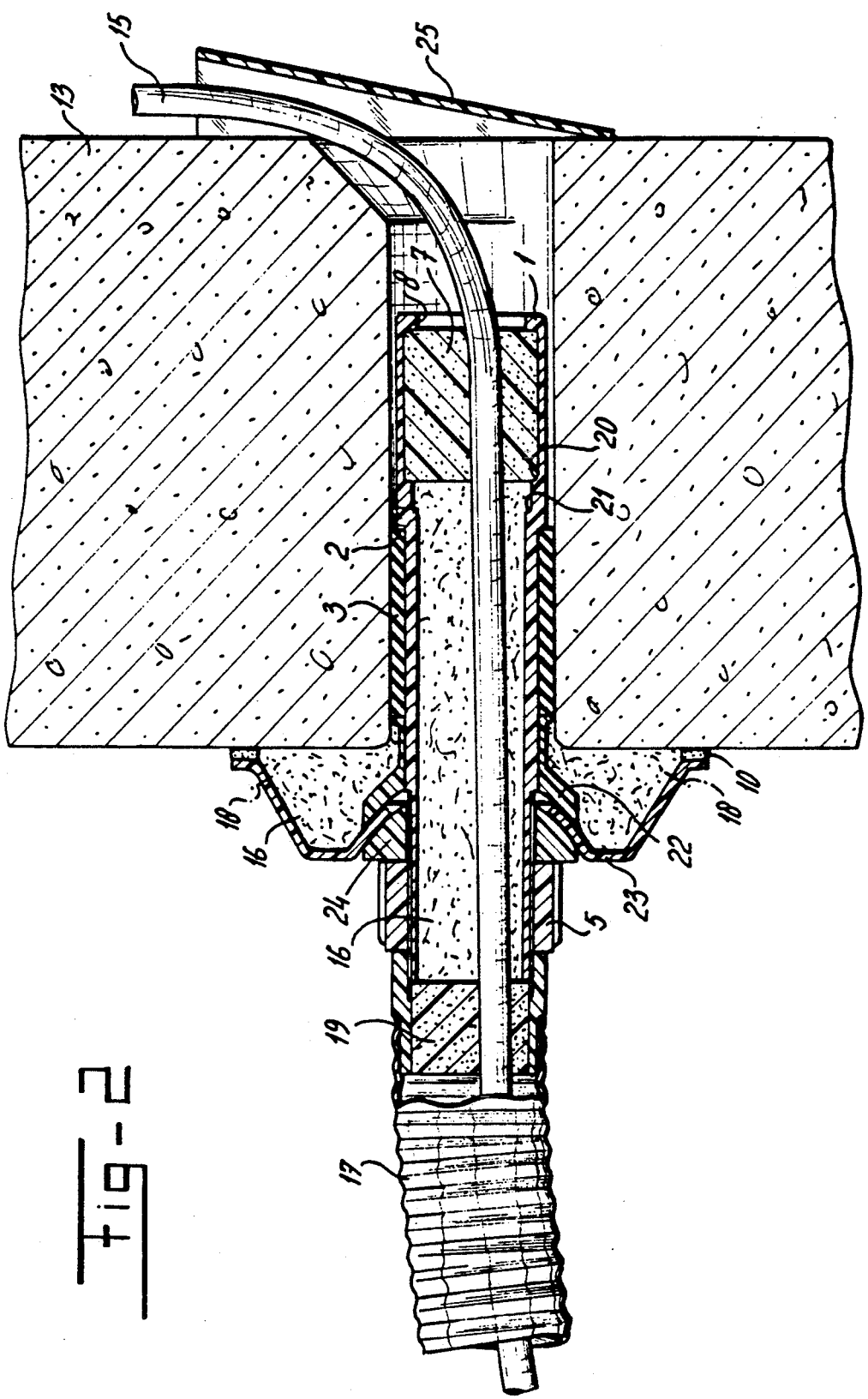

PROCESS AND SEALING AGENT FOR PRODUCING A WATERTIGHT AND/OR GASTIGHT BUSHING OF LINES IN A WATER-RESISTANT AND/OR GAS-BLOCKING WALL, AND DEVICE FOR USE THEREOF

This is a continuation of copending application Ser. No. 07/360,354 filed on Jun. 2, 1989 abandoned.

BACKGROUND OF THE INVENTION

The invention relates to a process for producing a watertight and/or gastight bushing of one or more lines in a water-resistant and/or gas-blocking wall. The lines can be of different kinds, such as pipes for liquids and gases and cables for electricity, telecommunications and the like.

The invention of the application also relates to a sealing agent for the production of a watertight and/or gastight bushing of one or more lines through a water-resistant and/or gas-blocking wall, and to a device for use thereof.

A process for the production of a flexible bushing is known from Dutch Patent Application 83.00334, according to which two sleeves are placed in the passage round the line to be passed through, and the space between them is filled with a flexible mixture, such as a polyurethane epoxy material.

Such a process has the disadvantage that once the filling mixture is applied no further lines can be passed through, and a completely watertight and/or gastight bushing is not always obtained.

European Patent Applications 161,557, 234,950 and 244,514 and Dutch Patent Applications 72.03941 and 80.01473 also disclose bushings for lines, which have the disadvantages that they are not watertight, are not flexible, are dependent on the wall thickness, and/or permit no subsequent passage of additional lines.

The problem to be solved by the invention is to provide a process for the production of a bushing of lines, by means of which a flexible bushing which is watertight and/or gastight even in a partially porous wall is obtained. The process according to the invention for the production of a watertight and/or gastight bushing of one or more lines through a water-resistant wall can be carried out in various ways.

SUMMARY OF THE INVENTION

According to one embodiment of the process, a shut-off element is fitted in the passage and at least part of the passage which connects to the shut-off element at the water-resistant side is filled with the sealing agent according to the invention, comprising a mouldable, water-swellable or swollen composition, and the lines are passed through before or after filling with the sealing agent.

The shut-off element can be a plate, a cylinder or another element in which apertures have been or can be made for the lines to be passed through. The shut-off element is preferably a resilient, drillable cylindrical plug of a water-resistant material, for example a styrene butadiene rubber or other type of rubber. Through the flexible fastening in the resilient plug and the mouldable sealing agent, fragile lines such as glassfibre cables can also be protected against vibrations. Another advantage of the process according to the invention is that in general the work need be carried out only from one side of the all. If the wall has such cavities that the mouldable composition could be pushed through them out of the passage, the shut-off element and the mouldable composition are preferably provided in a tubular element which fits into the passage, and this tubular element is installed tightly in the passage in a watertight layer of the wall.

The tight-fitting connection can be formed by a rubber expansion sleeve which is held down by means of an eye screw. It can be advantageous to shut off the tubular element also at the water-resistant side of the mouldable composition with a, preferably resilient, plug.

This means that the material of the mouldable composition is prevented from leaving the passage after extreme drying-out or as a result of a line being passed through or pulled out in the direction of the water-resistant side. This second plug can preferably move in the lengthwise direction of the tubular element, so that an expansion in the tube through the addition of a pipe or through the admission of water is absorbed.

If the structure of the wall material is such that the tight-fitting connection does not produce a complete shut-off for water and/or gas, or if the water- or gas-resistant action is derived only from a thin surface layer on the wall, for example a coating, complete water- or gas-tightness is achieved by, for example, fitting on the tubular element a dish-shaped cover which with a central aperture fits round a part of the tubular element projecting from the water- or gas-resistant side of the wall and pressing it against the wall, by means of e.g. the eye screw which also presses down the expansion sleeve. If necessary, the edge of the cover which presses against the wall is provided with a resilient, for example, rubber ring. The space between the cover and the wall is then preferably filled with the mouldable composition. The cover is made of, for example, a rigid plastic and is advantageously transparent, so that the filling of the space is easy to check. If the passage in the wall is not drilled vertically, the cover is fitted on the tubular element e.g. by means of a ball joint. With this embodiment of the process according to the invention a watertight bushing of lines through a water-resistant wall is obtained in all circumstances.

According to another simple embodiment of the process according to the invention, but one which is nevertheless expedient in many cases, at least part of the passage at the side of the water- or gas-resistant wall is filled with the sealing agent according to the invention, preferably after the lines have been passed through. It is advisable in this case also to treat the immediate vicinity of the passage with the sealing agent.

According to a preferred embodiment of the process according to the invention, the sealing agent is used in packed form for sealing the passage, preferably at the water- or gas-resistant side of the wall, and after the lines have been passed through. The packing is preferably a bag made of an elastic and porous fabric which is of such dimensions that the packed sealing agent according to the invention still remains extremely mouldable.

The lines can be passed through independently of each other at any desired stage, preferably from the water- or gas-resistant side of the wall. The lines to be passed through can be of different thicknesses, for example ranging from several mm to several cm. The passage can be of any desired diameter, for example ranging from several cm to several dm. The thickness of the wall in which the passage has to be made is not subject to any restriction at all. Nor do the material from which the all is built, the internal structure of the wall, or the way in which the wall exerts its water- and gas-resistant action constitute any hindrance whatsoever for the applicability of the invention.

The lines are advantageously fed through by means of throughfeed pins which are known per se, and are fixed for the purpose on the ends of the lines to be fed through.

The invention also relates to a sealing agent for the production of a watertight and/or gastight bushing of one or more lines through a water-resistant and/or gas-blocking wall. The type and number of component parts of the sealing agent according to the invention can vary.

The sealing agent must, however, by made up of at least two components, one of which is a natural or synthetic water-swellable or swollen high-molecular substance, while the other acts as a matrix material for the above-mentioned high-molecular substance. This matrix material ensures that in the event of excessive rainfall and/or high groundwater level the water-swellable or swollen high-molecular substance is held in place and/or in long dry periods protects the sealing agent from drying out and prevents the risk of cracks, which would cause the watertightness of the bushing to be lost. The most suitable natural or synthetic water-swellable or swollen high-molecular substances are water-swellable clay minerals, such as a clay containing smectite or montmorillonite, for example bentonite. Water-swellable polysaccharides and polysaccaride derivatives such as, for example, finely-ground cellulose, methylcellulose, hydroxyethylcellulose, water-swellable linked or unlinked starches or starch derivatives, starch-containing substances, such as wheat flour, water-swellable gums and also substances such as polyethylene oxide, polyvinyl alcohol, polyvinylpyrrolidone, polyacrylates and the like can be used.

The matrix material suitable according to the invention can be generally hydrophobic substances, in particular the hydrophobic substances which are characterized by a viscous and/or paste-like nature at room temperature.

Examples of suitable hydrophobic substances which can be mentioned are tar-like products, bitumen, vaseline and the like. In many cases it can be useful or desirable when preparing the sealing agent from the above-mentioned components to add a small quantity of a hydrophilic substance such as, for example, water. glycerol, sorbitol and the like. In this case it is preferable also to add an emulsifier of the water-in-oil type which preferably has a hydrophilic/lyophilic balance of 3 (three) or less.

The sealing agent prepared from the above-described components according to the invention is a mouldable composition which has unique and valuable properties for the production of watertight and/or gastight bushings for one or more lines through a water-resistant wall. It adheres firmly to widely differing materials, has the capacity to swell in water, and has a permanent plastic character which is easily mouldable. As a result of the more or less amoeba-like nature of the sealing agent, it not only seals watertight round the lines which have been passed through, but also, due to its swelling ability in water, seals in a waterproof manner any crevices and hair cracks in the inside wall of the passage and environment. Another important property of the sealing agent is that the bushing of the lines in the wall is flexible, which is important in particular for fragile lines, e.g. glassfibre cables, and also that one or more new lines can be passed through in a simple manner next to an existing line or can be replaced by a new line without the watertightness being lost. In practice, major advantages are obtained by using the sealing agent according to the invention in packed form, preferably packed in a bag made of an elastic and porous fabric of such dimensions that the sealing agent with covering is still extremely easy to mould. The size and shape of the bag can vary, but in order to be able to produce a good watertight bushing, out of practical considerations it will be closely correlated to the size and the shape of the passage in the water-resistant wall. When water, for example groundwater, penetrates through the pores of the fabric, the sealing agent swells, which further reinforces the seal. The shape of the bag can be rectangular or cylindrical. If the passage is large and is, for example, more or less rectangular in shape, it is preferable to use rectangular bags which when filled with the sealing agent have the appearance of small sandbags. These bags are stacked on top of each other in the passage and compressed, in the course of which the sealing agent partially passes out through the pores of the fabric, which contributes to complete sealing of the passage being achieved.

In the case of small, for example round, passages it is advantageous to use bags which are cylindrical in shape, and after filling with the sealing agent are sausage-like in appearance, and the diameter of which can easily be reduced not only be selecting the size, but also by stretching, in order to achieve a suitable seal of the passage. The sealing agent is prepared by intimately mixing the two main components with each other in a manner which is known per se, in a mixing ratio which varies from 5–70 per cent by weight, preferably 30–50 per cent by weight, of the high-molecular substance and from 95–30 per cent by weight, preferably 70–50 per cent by weight, of the hydrophobic substance. In order to promote good mixing of the components, it is advisable to lower the viscosity of the hydrophobic substance by heating. It can be desirable also to add a small quantity of a hydrophilic substance, for example water, or a polyhydric alcohol, in a quantity varying from 0–4 per cent by weight of the mixture, preferably in the presence of an emulsifier of the water-in-oil type.

If desired, inert substances and the like, for example china clay, can also be added to the sealing agent.

The invention of the application also relates to a device for passing lines through a water-resistant wall in a watertight manner. This device is explained in greater detail with reference to the appended figures.

BRIEF DESCRIPTION OF THE DRAWINGS

FIG. 2 is a sectional view showing a slightly modified embodiment of the device.

DETAILED DESCRIPTION OF THE PREFERRED EMBODIMENTS

Figure 1:
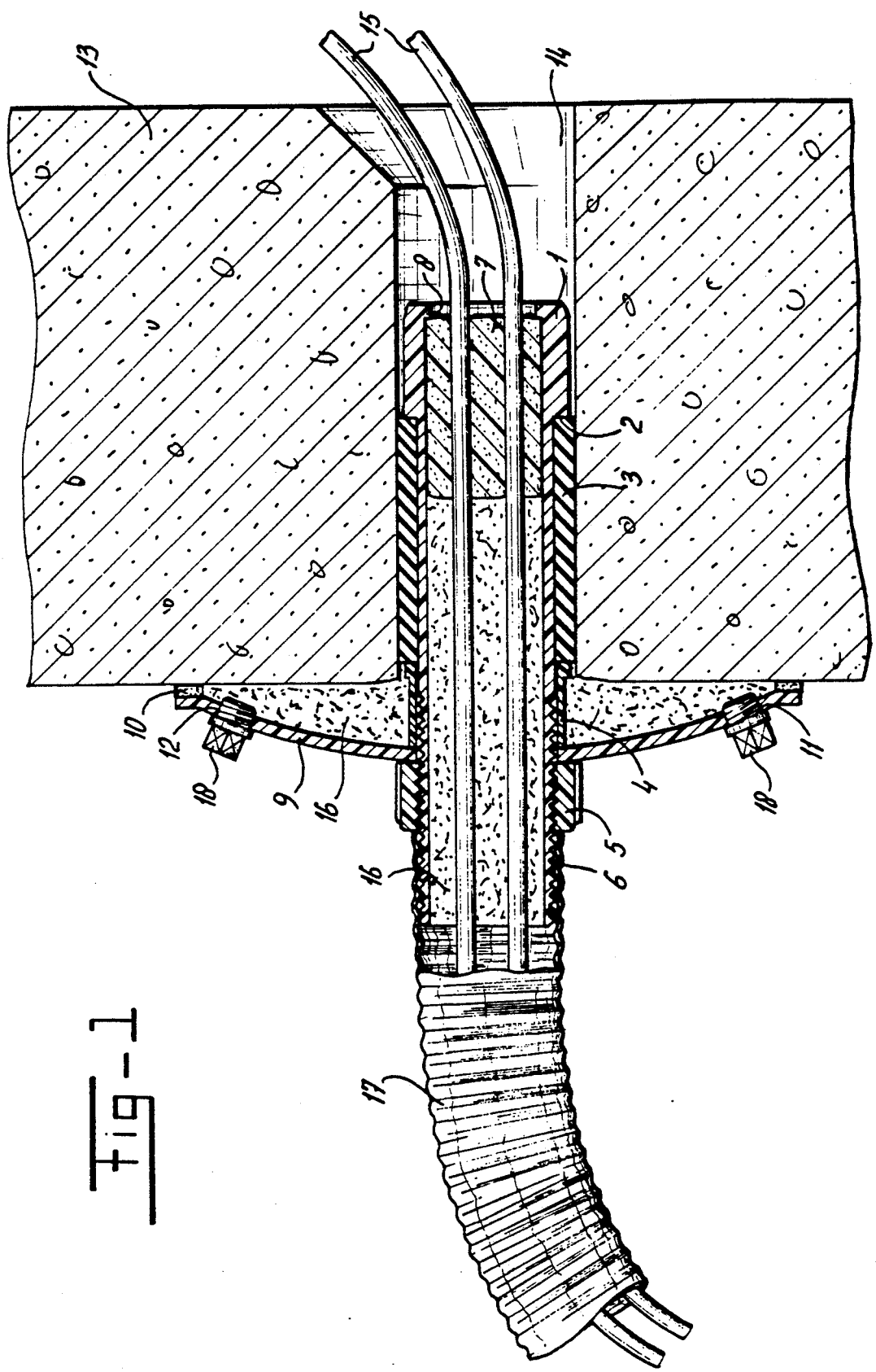
FIG. 1 is a sectional view showing an embodiment of the device according to the invention, as fitted in the wall, the numbers being explained in the explanation which follows.

FIG. 1 shows a tubular element 1, which is shown in a passage 14 in a wall 13. The tubular element 1 has an edge 2 against which rests an expansion sleeve 3, which can be pressed by means of a pressure ring 5, possibly via distance ring 4, thereby clamping the element in the wall. The tubular element 1 is provided with a screw thread 6, along which ring 5 can be screwed.

The tubular element contains in a close fit a resilient cylindrical plug 7 through which a plurality of lines can be inserted. The plug 7 is prevented by an internal annular edge 8 from leaving the tubular element 1. This edge 8 can taper inwards (not shown), in such a way that the plug can be inserted into the element 1 along this edge.

Around the part of the tubular element 1 projecting out of the wall at the water-resistant side this embodiment has a dish 9 which is provided with a resilient ring 10, which ensures that the space between the wall and the dish is shut off.

When the dish 9 is used, the spacer ring 4 is necessary. The dish is provided with a filling aperture 11 and a venting aperture 12, which can be closed by means of plugs 18.

The tubular element 1 and the space behind the disk 9 are filled with a mouldable sealing agent 16 according to the invention. The lines 15, which in this figure are shown as two lines of the same cross section, are conveyed through the sealing agent 16 and the plug 7. However, a greater number of lines, also of varying thicknesses, can also be passed through. If desired, the shape of the passage at the non-water-resistant side of the wall can be adapted to the remaining course of the lines, as shown in this figure. At the water-resistant side the lines can be supported by means of a flexible guide sleeve 17 which fits, for example, on screw thread 6.

FIG. 2 shows a similar embodiment of the device according to the invention. In this figure a second internal edge 20 and a third internal edge 21 are also shown in the tubular element, which prevent the first resilient plug from sliding further in and hold the lines at least partially a distance away from the inner edge of the tubular element. At the other end of the tube there is in this case a second cylindrical plug 19 which shuts off the mouldable sealing agent and can also be drilled through. The embodiment according to this figure is also suitable for passages which are not drilled vertically in the wall. For this purpose, cover 23 here has a larger central aperture with a curved inner edge which fits between a concave ring 22 and a convex ring 24. All this is in turn pressed down by ring 5. For a complete shut-off of the space behind the cover, ring 22 is provided with an O-ring on the inside. FIG. 2 also shows a covering cap 25 which guides the lines in the desired direction, and behind which there can be a fire-resistant material.

I claim:

1. Sealing agent for producing a watertight bushing of one or more lines through a water-resistant wall, comprising an intimate mixture of 5–70% by weight of a high molecular substance capable of swelling in water selected from the group consisting of water-swellable clay minerals, water-swellable polysaccharides, water-swellable polysaccharide derivatives, starches, starch derivatives, polyalkalene oxides, polyvinyl alcohol, polyvinylpyrrolidone and polyacrylates and 30–95% by weight of a viscous hydrophobic substance capable of becoming less viscous upon heating, selected from the group consisting of tar, bitumen and vaseline, said mixture having the character of a permanently deformable, plastic paste, said mixture also containing a hydrophilic substance selected from the group consisting of water and polyhydric alcohols in an amount greater than 0% and not exceeding 4% by weight of the mixture.

2. Sealing agent according to claim 1, wherein the mixture is packed in a bag made of an elastic and porous fabric of such dimensions such that the whole combination remains deformable.

3. Sealing agent according to claim 1, wherein the water-swellable high-molecular substance is bentonite, the hydrophobic substance is vaseline, and the hydrophilic substance is water.

4. Sealing agent according to claim 1, wherein said high-molecular substance is a water-swellable clay mineral.

5. Sealing agent according to claim 1, wherein said high-molecular substance is bentonite.

6. Sealing agent according to claim 1, wherein said hydrophobic substance is vaseline.

7. Sealing agent according to claim 1, wherein said hydrophilic substance is water.

8. Sealing agent according to claim 1, wherein said mixture further contains a water-in-oil emulsifier.

* * * * *